(12) United States Patent
Noble

(10) Patent No.: US 12,012,989 B2
(45) Date of Patent: Jun. 18, 2024

(54) SYSTEM AND METHOD OF RELEASABLY SECURING A WEDGE IN A GAP

(71) Applicant: Pure Vista Ltd, Bodmin (GB)

(72) Inventor: Angus Noble, Totnes (GB)

(73) Assignee: Pure Vista Ltd, Bodmin (GB)

( * ) Notice: Subject to any disclaimer, the term of this patent is extended or adjusted under 35 U.S.C. 154(b) by 242 days.

(21) Appl. No.: 17/217,152

(22) Filed: Mar. 30, 2021

(65) Prior Publication Data

US 2021/0301850 A1    Sep. 30, 2021

(30) Foreign Application Priority Data

Mar. 30, 2020 (GB) .................................. 2004585

(51) Int. Cl.
*F16B 5/06* (2006.01)
*E04F 11/18* (2006.01)

(52) U.S. Cl.
CPC ............ *F16B 5/06* (2013.01); *E04F 11/1853* (2013.01); *E04F 2011/1895* (2013.01)

(58) Field of Classification Search
CPC ........... E04F 2011/1895; E04F 11/1853; E04F 2011/1823; F16B 5/06; F16B 2/14; E06B 3/5454; E06B 3/5864
See application file for complete search history.

(56) References Cited

U.S. PATENT DOCUMENTS

| 4,892,435 A | 1/1990 | Anderson | |
| 6,105,333 A * | 8/2000 | Meesemaecker | E05F 11/385 52/204.64 |
| 7,730,682 B2 * | 6/2010 | Nash | E06B 3/5454 52/800.18 |
| 7,748,178 B2 * | 7/2010 | Haab | B32B 17/10036 403/388 |
| 8,122,654 B2 * | 2/2012 | Sprague | E04F 11/1851 52/204.64 |
| 8,826,621 B2 * | 9/2014 | Noble | E04F 11/1851 52/584.1 |
| 9,816,276 B2 * | 11/2017 | Noble | E04F 11/1812 |

(Continued)

FOREIGN PATENT DOCUMENTS

| DE | 202013100585 U1 * | 4/2013 | ............... F16B 2/04 |
| DE | 102020101907 A1 * | 7/2021 | ........... E04F 11/1853 |
| EP | 2101010 | 9/2009 | |

OTHER PUBLICATIONS

EPO, Search Report in corresponding EPO App 21165297.9, dated Jul. 29, 2021.

(Continued)

*Primary Examiner* — Matthew R McMahon
(74) *Attorney, Agent, or Firm* — Alley IP

(57) ABSTRACT

Open-topped channels/troughs are often used as a footing in which glass panels may be placed and secured substantially vertically. A tapered wedge may be forced into the gap around the panel. As gradually wider portions of the wedge are forced into the gap, the panel is gripped ever tighter. However, it is often difficult to remove panels secured in this manner. The present invention provides a wedge support which can be separated into two portions by the insertion of a tool into a tool socket. In this way, if a wedge is used with the wedge support, the wedge support may be removed with the tool thereby permitting easy removal of the wedge.

6 Claims, 6 Drawing Sheets

(56) References Cited

U.S. PATENT DOCUMENTS

| | | |
|---|---|---|
| 11,220,823 B2* | 1/2022 | Bieler ................ E04F 11/1853 |
| 2009/0230372 A1 | 9/2009 | Sprague |
| 2022/0049501 A1* | 2/2022 | Sprague .............. E04F 11/1853 |

OTHER PUBLICATIONS

UK IPO, Combined Search and Examination Report in corresponding GB App 2004585.2, dated Sep. 22, 2020.

* cited by examiner

SYSTEM AND METHOD OF RELEASABLY SECURING A WEDGE IN A GAP

RELATED APPLICATIONS

This application claims priority under 35 U.S.C. § 119 to GB Application 2004585.2, filed Mar. 30, 2020, such GB Application also being incorporated by reference herein in its entirety.

FIELD

The present invention relates generally to a wedge support and a method of releasably securing a wedge in a gap and finds particular, although not exclusive, utility in securing glass panels in support troughs and channels.

BACKGROUND

Open-topped channels/troughs are often used as a footing in which glass panels may be placed and secured substantially vertically. Many different fixing mechanisms are known, particularly those that permit alignment of the panel in the channel either away from vertical, or toward vertical in the case of channels that are secured to non-horizontal surfaces. It is well established that the simplest fixing mechanism is merely to wedge such a panel in place within the channel. Optional packing elements may be used around the panel and within the channel, and a tapered wedge may be forced into the gap around the panel. As gradually wider portions of the wedge are forced into the gap, the panel is gripped ever tighter.

However, it is often difficult to remove panels secured in this manner. In particular, it can be difficult to remove such wedges.

SUMMARY

According to a first aspect of the present invention, there is provided a wedge support for releasably securing a wedge in a gap between a first object and a second object, the wedge support configured to be arrangeable within the gap adjacent to the first object and orientated with a first side of the wedge support proximal to an opening of the gap, such that a wedge is forceable into the gap, between the second object and the wedge support, the wedge support comprising: a first portion; a second portion releasably attached to the first portion; and a tool socket located on the first side of the wedge support; wherein insertion of a tool into the tool socket permits separation of the first portion from the second portion.

In this way, the first object may be secured in position relative to the second object by placement of the wedge within the gap between the second object and the wedge support. The gap is secured by a tight fit between the wedge and the wedge support, making it difficult to remove the wedge from the gap. If the relative position of the first object and the second object requires adjustment, the tool may be inserted into the tool socket to permit separation of the first portion and the second portion. With the wedge support no longer securely adjacent to the wedge, the wedge is then relatively free to move within the gap and the first object and/or second object may be repositioned, and the process of securing may be repeated if so desired.

There are various different ways in which separation of the first portion from the second portion may occur. Some options are less practical than others, for example, having an intermediate portion of the wedge support dissolve after introduction of water (or some other solvent) by the tool, or removal of a plug portion with a tool to release pressurised fluid (e.g. air) inside. However, in preferred embodiments, separation of the first portion from the second portion may be by mechanical means. In particular, separation may be in a direction substantially parallel to a longitudinal extension of the first side of the wedge support, for example in a direction substantially parallel to a longitudinal extension of the opening of the gap, and/or substantially at right angles to the direction of insertion of the wedge support, wedge and/or tool into the opening.

The first side may have a longitudinal extension that is intended to extend along the gap being wedged. That is, the first side may have a lateral extension that is intended to extend partially across the gap being wedged (i.e. between a first object and a wedge).

The wedge support may be constructed from a plastics material, wood, metal and/or any other suitable material.

The wedge support may comprise substantially rigid, pliable and/or resilient regions, for example parts of or the whole first and/or second portions. In this way, the wedge support material may be selected to suit the particular requirements of the objects being secured. For example, robust objects may require the use of rigid materials, while delicate objects may require the use of more pliable/resilient materials. Materials may be selected for particular regions of the wedge support to compensate for particular forces exerted at those regions. For example, a wedge support intended to be used between a pane of glass and a rubber wedge may include a resilient surface for contact with the glass and a rigid surface for contact with the wedge.

The wedge support may comprise a substantially rectangular profile in a cross-section taken at right angles to a plane of the first side, for example the wedge support may be the same thickness from the first side of the wedge support to the second side of the wedge support, the second side substantially opposite the first side.

The wedge support may comprise a tapered profile in a cross-section taken at right angles to a plane of the first side. The tapered profile may be such that the wedge support is wider at the first side than at the second side of the wedge support. In this way, the second side of the wedge support may fit into the gap distal from an opening of the gap, while the first side may facilitate the wedge support being locatable within the gap for receiving the wedge.

Of course, other shapes and profiles are envisaged, for example to match a particular wedge to be used, or an interior surface of a gap.

The wedge support may comprise a specific profile that corresponds to a gap between the first object and the second object, such that the wedge support conforms to the first object and/or second object. The specific profile may comprise at least one substantially flat side and/or at least one substantially irregular side. A third side of the wedge support locatable substantially adjacent to the wedge may comprise grooves, projections, ridges and/or indents. In this way, the wedge support may be configured to correspond to the profile of the second object.

A fourth side of the wedge support locatable substantially adjacent to the first object may comprise grooves, projections, ridges and/or indents. In this way, the wedge support may be configured to correspond to the profile of the first object.

The wedge support may comprise a recess for receiving a wedge therein. The recess may extend along an entire length of the wedge support between the first side and the second side and/or may extend across an entire width of the wedge support. Alternatively, the recess may extend along a partial length of the wedge support in a direction parallel and/or at right angles to the extension of the first side. The recess may be located on a third side of the wedge support locatable substantially adjacent to the wedge.

A surface of the recess may comprise ridges, bumps, dimples and/or a textured surface for improving the retention of a wedge inserted into the recess and forced into the gap. The ridges, bumps, dimples and/or textured surface may increase the surface area of physical contact and/or friction between the recess and the wedge. The ridges may extend in any direction parallel to a surface of the recess, for example parallel to the longitudinal extension of the first side, at right angles to the longitudinal extension of the first side and/or at an acute/oblique angle relative to the longitudinal extension of the first side.

The first side of the wedge support may have a longitudinal extent of between 0.5 cm and 100 cm, in particular between 2 cm and 40 cm, more particularly between 5 cm and 15 cm, for example 10 cm. The second side of the wedge support may have a longitudinal extent of between 0.5 cm and 100 cm, in particular between 2 cm and 40 cm, more particularly between 5 cm and 15 cm, for example 10 cm. The thickness of the wedge support may be between 0.5 cm and 80 cm, in particular between 1 cm and 20 cm, more particularly between 1 cm and 10 cm, for example 2 cm.

The third side of the wedge support may have a longitudinal extent of between 0.5 cm and 100 cm, in particular between 5 cm and 50 cm, more particularly between 8 cm and 20 cm, for example 12 cm.

The fourth side of the wedge support may have a longitudinal extent of between 0.5 cm and 100 cm, in particular between 5 cm and 50 cm, more particularly between 8 cm and 20 cm, for example 12 cm.

Releasable attachment of the first portion and the second portion may be via a friction/interference fit, adhesive coupling, magnetic coupling and/or mechanical coupling. The first portion and the second portion of the wedge support may comprise corresponding contours to facilitate the releasable attachment, for instance such that when attached the first portion and the second portion are united with substantially no gaps at an interface between the first portion and the second portion.

The first portion and the second portion may comprise corresponding interlocking extensions. In this way, the strength and/or repeatability of the releasable attachment may be improved. The interlocking extensions may extend longitudinally along at least one side of the first portion and/or the second portion. The interlocking extensions may extend parallel to, at right angles to and/or at any other angle relative to the longitudinal extension of the first side of the wedge support. The first portion and the second portion may each comprise between 1 and 10 interlocking extensions, in particular between 2 and 7 interlocking extensions, more particularly 5 interlocking extensions, for example 3 interlocking extensions.

The gap between the first object and the second object may be between 0.5 cm and 100 cm wide, more particularly 50 cm wide, for example 5 cm wide. The first object and/or second object may be any body of mass, for example a wall or a board. In one particular example, the first object may be a longitudinal trough and the second object may be a panel, such as a glass panel.

The wedge may be any suitable object that is wedgeable within the gap. The wedge may be substantially cuboid, or the wedge may comprise one thick end tapering to a thinner end, for example a triangular prism or trapezoidal prism. The wedge may be any shape, providing that a portion of that shape fits within the gap. The wedge may comprise rigid, pliable and/or resilient regions, for example parts of or the whole wedge. A surface of the wedge may comprise ridges, bumps, dimples and/or a textured surface for improving its retention when inserted into the recess and forced into the gap. The ridges may increase the surface area of physical contact and/or friction between the wedge, the recess and/or the second object. The ridges may extend in any direction parallel to a surface of the wedge, for example in a direction parallel to an opening of the gap.

The wedge may comprise a medial trough, which may facilitate the compressibility and/or adjustability of the wedge when located within the gap.

The wedge may comprise at least one trough on a side of the wedge locatable adjacent to the second object. The at least one trough may decrease the amount of material required to construct the wedge, and may also facilitate removal of the wedge from the gap.

Forcing the wedge within the gap may comprise the application of force by a person, a tool, and/or a machine.

The tool socket may extend across the first portion and the second portion. The tool socket may extend across the entire width of the first portion and the second portion, and/or a part of the first and the second portion. The tool socket may be located substantially at the junction of the first portion and the second portion. The tool socket may be substantially the same breadth as the wedge support, intersecting the third side and the fourth side of the wedge support. Alternatively, the tool socket may have a breadth less than the breadth of the wedge support. The tool socket may extend along the length of the wedge support between the first side and the second side. The tool socket may be a cylindrical, cuboid, or alternatively shaped cavity in the first portion and the second portion. The tool socket may extend from the first side along the third side of the wedge support. The tool socket may be tapered, such that the width of the tool socket is wider at an end proximal to the first side of the wedge support than an end distal to the first side of the wedge support. The tool socket may have a substantially triangular cross-sectional shape. The tool socket may be located within the recess in the wedge support.

According to a second aspect of the present invention, there is provided a system for releasably securing a gap, the system comprising: the wedge support of the first aspect; and a tool; wherein insertion of the tool within the tool socket permits separation of the first portion from the second portion.

The tool may be any object which is insertable into the tool socket. Insertion may mean a part of the tool is received within the tool socket, and/or the whole tool is received within the tool socket. Insertion of the tool into the tool socket may overcome the releasable attachment of the first and second portion. Incremental insertion of the tool into the tool socket may incrementally separate the first and second portions from each other in the longitudinal direction of the first side of the wedge support. In this way, the first and second parts are moved transversely to the wedging forces acting within the gap (i.e. a force component acting across the gap, and a force component acting into the gap from the opening). The first and second portions may be separated by the tool far enough that the space between them is greater than the width of the wedge; however, in alternative, the first and second portions may be separated by the tool such that the space between them is less than the width of the wedge. Accordingly, the force between the wedge and wedge support will be reduced or negated, allowing for removal or repositioning of the wedge and/or wedge support within the gap.

The tool may comprise a tapered profile that corresponds to a tapered profile of the tool socket. In this way, as the tool is further inserted into the tool socket, the width of the tool incrementally increases, thereby pushing the first portion and the second portion of the wedge support apart. The tool may comprise a triangular shaped tip for insertion into the tool socket. The tool may comprise a medial ridge for aiding with reproducible insertion of the tool within the tool socket and for improving the efficiency of the separation of the first portion and the second portion. Other geometries of the tool and/or tool socket are contemplated, for example the tool may comprise a conical shape for insertion within a tool socket comprising a smaller conical shape. The tool and/or tool socket may comprise a screw thread. The tool may be configured for insertion within the tool socket such that full insertion and/or movement of the tool within the tool socket overcomes a mechanical bias maintaining the connection between the first portion and the second portion of the wedge support, much like a lock and key mechanism.

The tool may comprise a handle and/or aperture. In this way, the ergonomics of insertion and removal of the tool may be improved.

The system may further comprise a wedge arrangeable within the gap, adjacent to the wedge support.

According to a third aspect of the present invention, there is provided a method of releasably securing a gap, the method comprising: providing the system of the second aspect; arranging the wedge support within a gap between a first object and a second object, adjacent to the first object and orientated with a first side of the wedge support proximal to an opening of the gap; forcing a wedge into the gap, between the second object and the wedge support; inserting the tool within the tool socket; and separating the first portion from the second portion.

The wedge support may be configured to be pivotable within the gap about an axis substantially parallel to the first side of the wedge support. Alternatively or additionally, the wedge support may be configured to be pivotable about an axis substantially at right angles to the first side of the wedge support. In this way, the angle of inclination of the wedge support relative to the first object and/or second object may be adjustable when the wedge support is arranged within the gap. This may enable adjustable inclination of the first object and/or second object.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1:
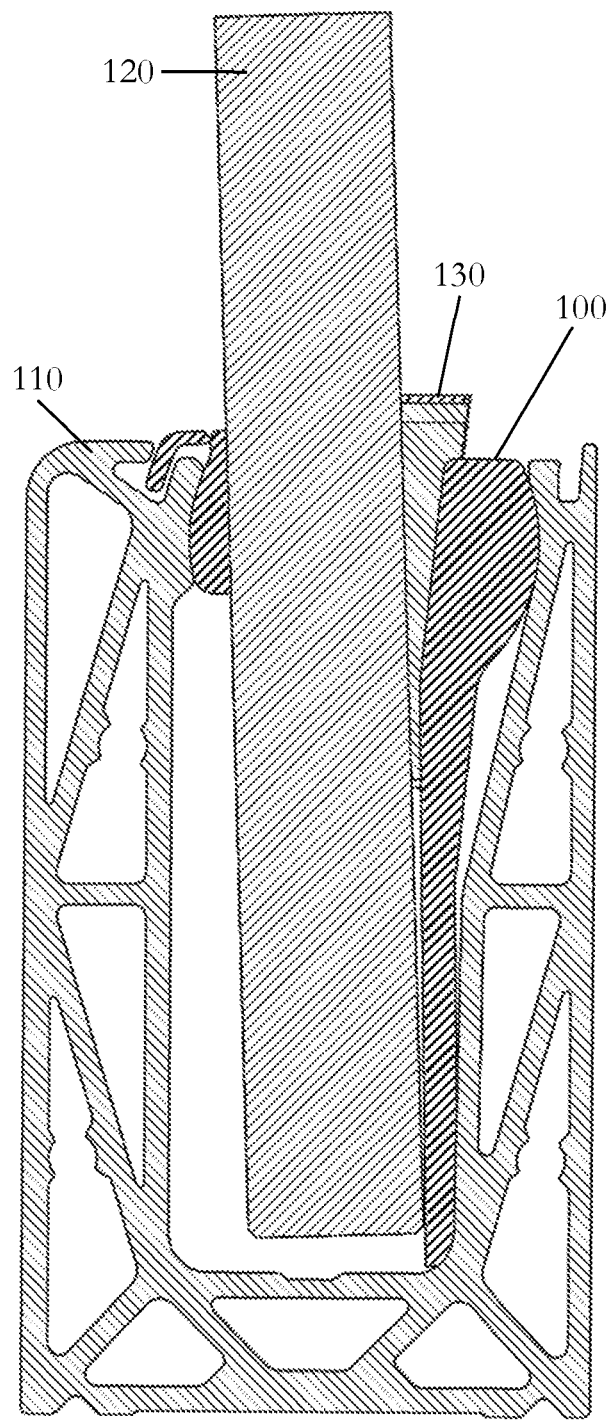
FIG. 1 is a side cross-sectional view of a panel secured within a trough with a wedge support and a wedge.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein. Likewise, method steps described or claimed in a particular sequence may be understood to operate in a different sequence.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other. For instance, wireless connectivity is contemplated.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any one embodiment or aspect of the invention may be combined in any suitable manner with any other particular feature, structure or characteristic of another embodiment or aspect of the invention, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances. The use of the term "any" may mean "all" and/or "each" in certain circumstances.

The principles of the invention will now be described by a detailed description of at least one drawing relating to exemplary features. It is clear that other arrangements can be configured according to the knowledge of persons skilled in the art without departing from the underlying concept or technical teaching, the invention being limited only by the terms of the appended claims.

FIG. 1 is a side cross-sectional view of a wedge support 100 arranged within a trough 110. A rectangular cuboid panel 120 is arranged upright within the trough 110, with the wedge support 100 located adjacent to a wedge 130 to secure a gap between a side of the panel 120 and a side of the trough 110. The walls of the trough 110 are partially hollow and comprise a lattice of cross-members. The wedge support 100 is wider at a first side proximal to the gap than it is at a second side proximal to the base of the trough 110. The wedge support 100 has a third side adjacent to the wedge 130 and a fourth side adjacent to a side of the trough 110. The wedge support 100 comprises a rounded section at its first side, with a bent profile along a vertical axis that tapers down to the second side. The wedge support 100 may be rotatable within the trough 110 for adjustable inclination of the panel 120. One entire side of the wedge 130 is in contact with the panel 120, while a majority of another side of the wedge 130 is in contact with the wedge support 100. A portion of one side of the wedge 130 protrudes from the first side of the wedge support 100, with the remainder of the same side of the wedge 130 recessed within the wedge support 100.

Figure 2:
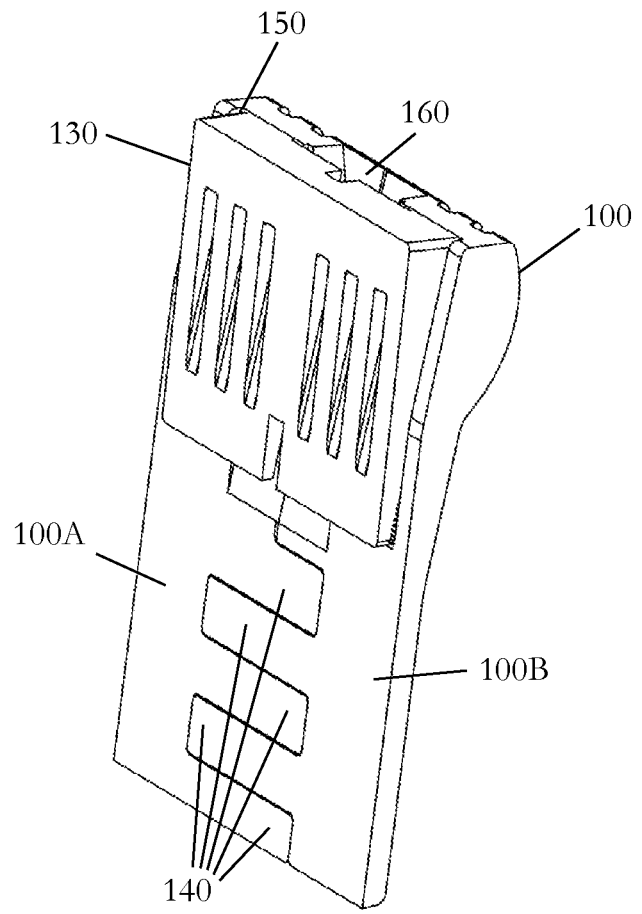
FIG. 2 is a perspective view of the wedge support and wedge of FIG. 1.

FIG. 2 is a perspective view of the wedge support 100 and wedge 130 of FIG. 1, shown in isolation from the panel 120 and trough 110. The wedge support 100 comprises a first portion 100A and a second portion 100B, and is substantially rectangular in shape on its third side. The first portion 100A and the second portion 100B are shown attached with an interface substantially halfway along the third side. Both the first portion 100A and the second portion 100B comprise interlocking extensions 140 which facilitate the attachment of the first portion 100A and the second portion 100B to form the wedge support 100. The wedge 130 is shown inserted within a recess 150 on the third side of the wedge support 100. The side of the wedge 130 facing away from the third side of the wedge support 100 comprises six vertical troughs. An opening of a tool socket 160 is visible on the first side of the wedge support 100, with the rest of the tool socket 160 obscured by the wedge 130.

Figure 3:
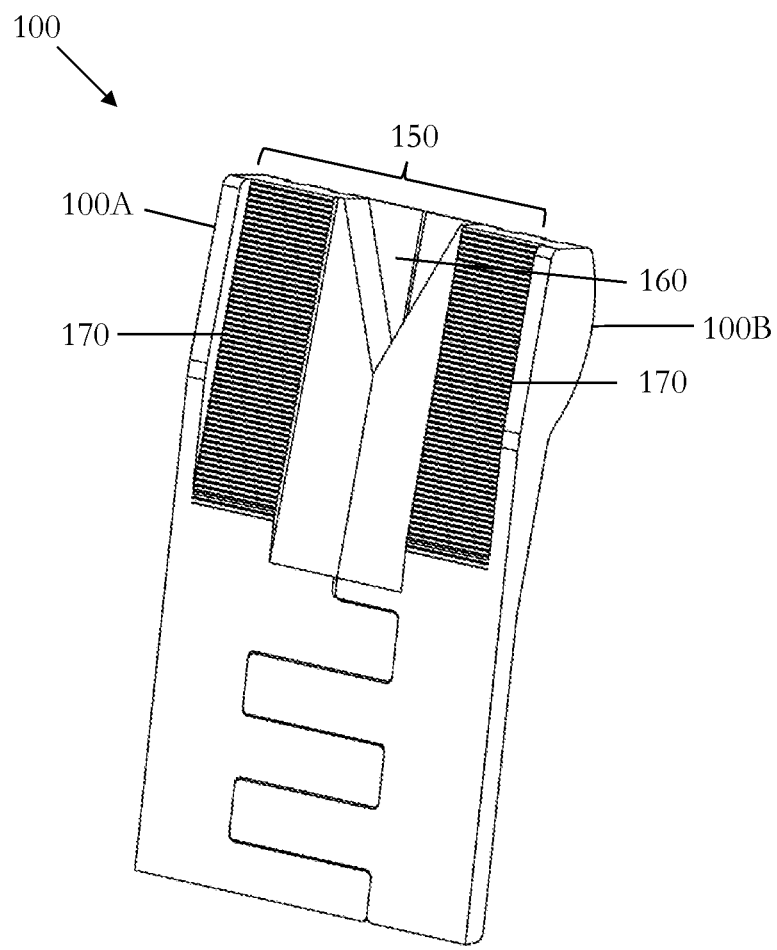
FIG. 3 is a perspective view of the wedge support of FIG. 1.

FIG. 3 is a perspective view of the wedge support 100 of FIG. 1, shown on its own. The recess 150 occupies a substantially rectangular portion of the third side of the wedge support 100, proximal to the first side of the wedge support 100. The recess 150 comprises two ridged portions 170, each comprising ridges running parallel to the first side of the wedge support 100. The ridges may improve the retention of a wedge 130 inserted into the recess 150. The tool socket 160 is triangular in shape and is located medially within the recess 150, at a junction between the first portion 100A and the second portion 100B.

Figure 4:
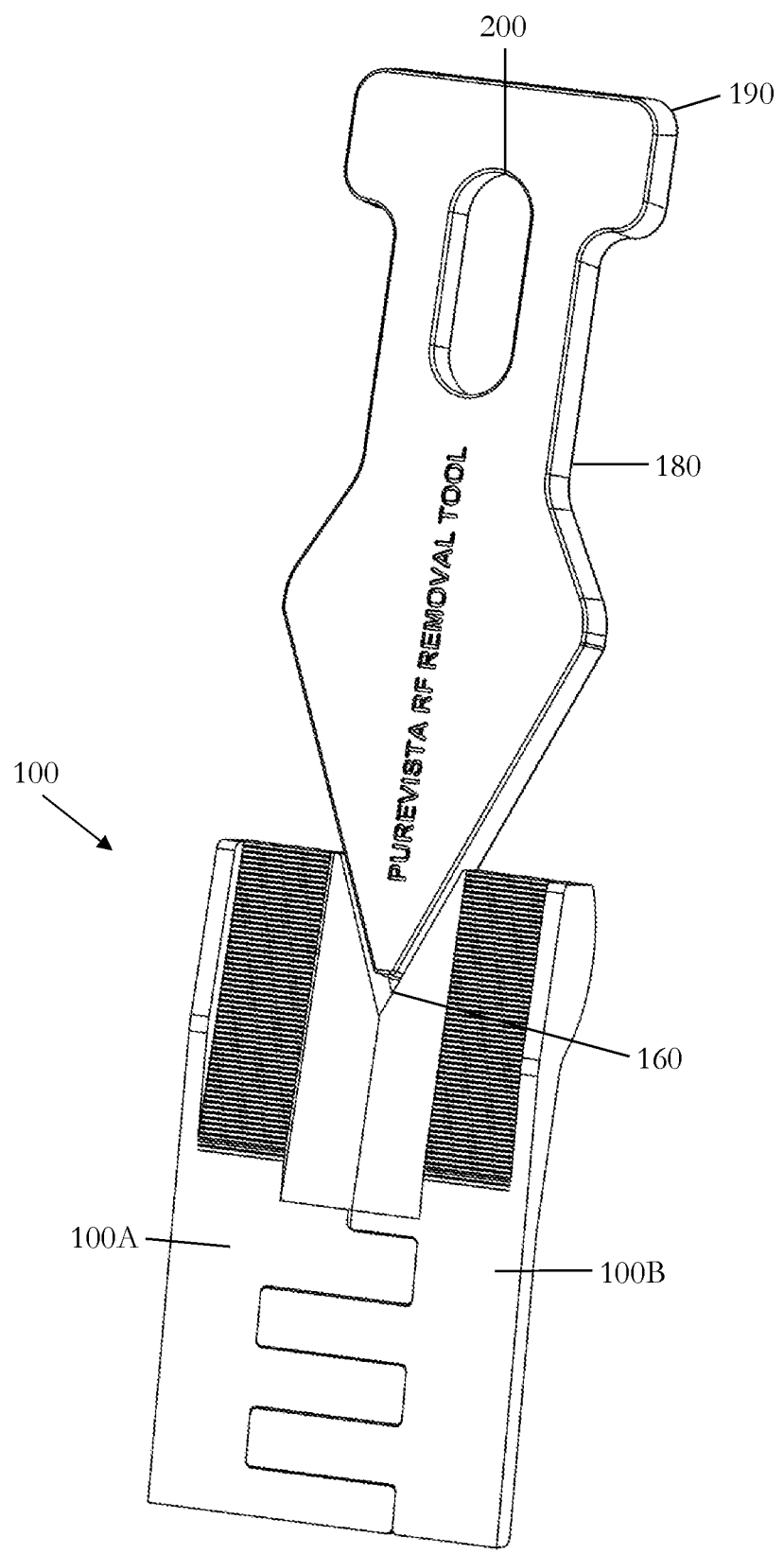
FIG. 4 is a perspective view of the wedge support of FIG. 1, with a tool partially inserted within a tool socket located on the wedge support.

FIG. 4 is a perspective view of the wedge support 100 of FIG. 1, shown with a tool 180 partially inserted within the tool socket 160. The tool 180 comprises a diamond shaped head with a triangular tip which corresponds with the triangular shape of the tool socket 160. The tool 180 also comprises a handle 190 with an aperture 200 which may facilitate the ergonomics of the tool 180.

Figure 5:
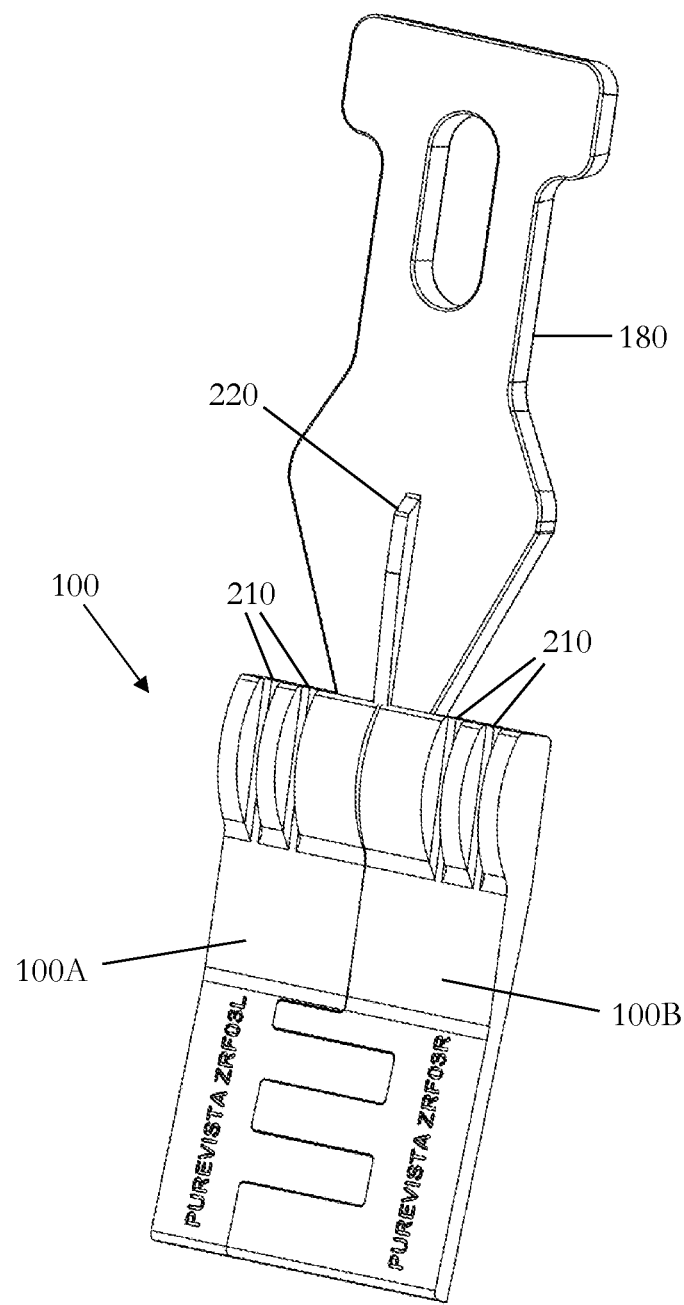
FIG. 5 is a perspective view of the back of the arrangement shown in FIG. 4.

FIG. 5 is a perspective view of the back of the arrangement in FIG. 4, showing the fourth side of the wedge support 100. The fourth side comprises vertical longitudinal grooves 210 on a portion of the wedge support 100 proximal to the first side, which may facilitate the arrangement of the wedge support 100 within the trough 110. The visible side of the tool 180 comprises a medial ridge 220 proximal to the triangular tip, which may facilitate insertion of the tool 180 within the tool socket 160 and/or separation of the first portion 100A and the second portion 100B.

Figure 6:
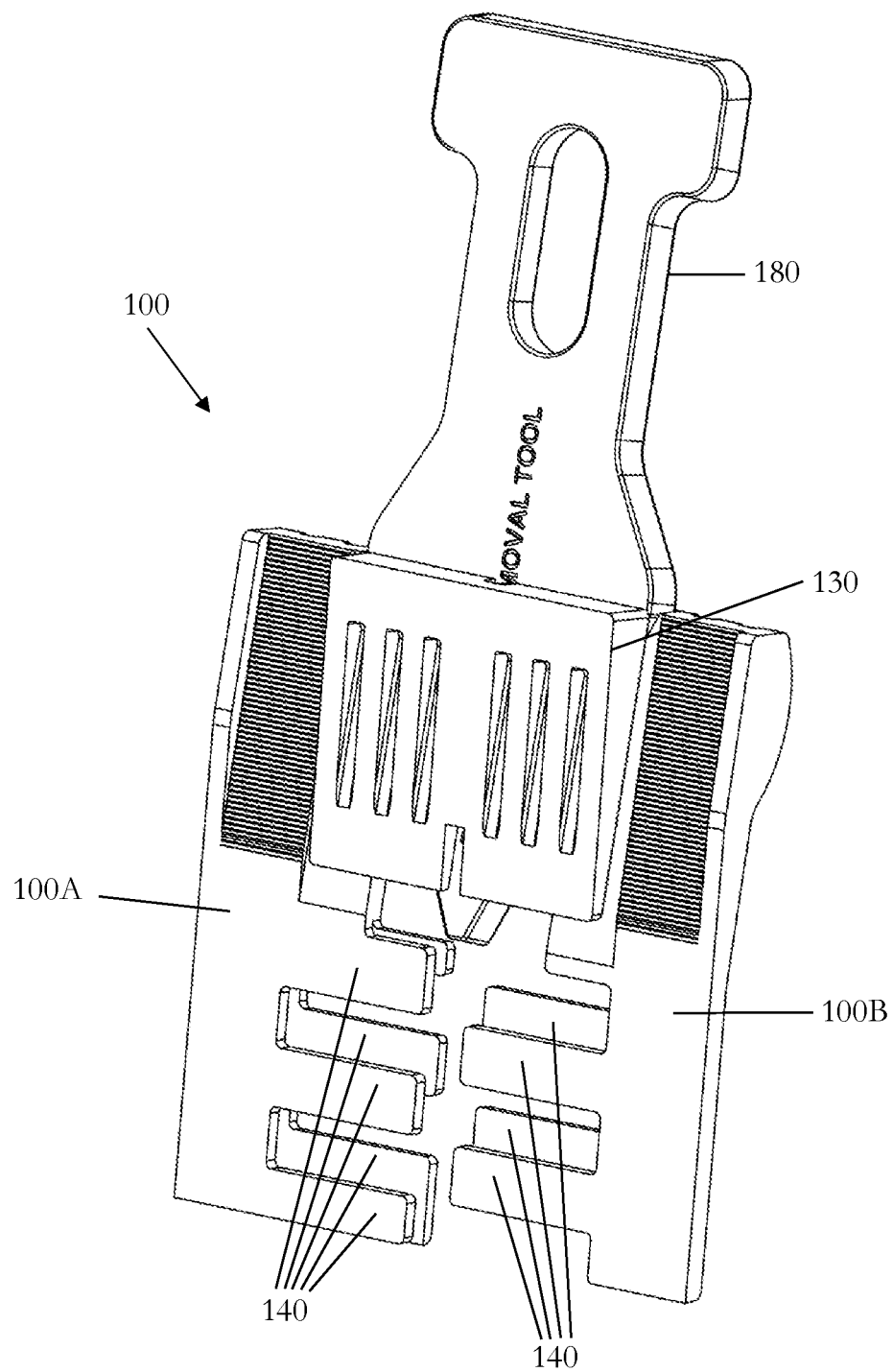
FIG. 6 is a perspective view of the wedge support and wedge of FIG. 1, with the tool of FIG. 4 inserted further into the tool socket, thereby separating the wedge support into a first portion and a second portion.

FIG. 6 is a perspective view of the wedge support 100 of FIG. 1, shown with the tool 180 fully inserted within the tool socket 160, behind the wedge 130. Full insertion of the tool 180 within the tool socket 160 (not shown) may mean that the widest part of the tool 180 is located within the tool socket 160. The first portion 100A and the second portion 100B are shown unattached, with gaps between the interlocking extensions 140.

The invention claimed is:

1. A wedge support for releasably securing a wedge in a gap between a first object and a second object, the wedge support configured to be arrangeable within the gap adjacent to the first object and orientated with a first side of the wedge support proximal to an opening of the gap, such that the wedge is forceable into the gap, between the second object and the wedge support, the wedge support comprising:
   a first portion;
   a second portion releasably attached to the first portion; and
   a tool socket located on the first side of the wedge support, wherein,
      the tool socket extends across the first portion and the second portion,
      insertion of a tool into the tool socket permits separation of the first portion from the second portion, and
      the first portion and the second portion each include two to seven extensions, wherein the extensions of the first portion all interlock with the corresponding extensions from the second portion.

2. The wedge support of claim 1, wherein the separation is in a direction substantially parallel to a longitudinal extension of the first side of the wedge support.

3. The wedge support of claim 1, further comprising a recess for receiving the wedge therein.

4. A system for releasably securing a gap, the system comprising:
   the wedge support according to claim 1; and
   a tool, wherein insertion of the tool within the tool socket permits separation of the first portion from the second portion.

5. The system of claim 4, wherein the tool socket comprises a tapered profile, and the tool comprises a tapered profile that corresponds to the tapered profile of the tool socket.

6. A method of releasably securing a gap, the method comprising:
   providing the system of claim 4;
   arranging the wedge support within a gap between a first object and a second object, adjacent to the first object and orientated with a first side of the wedge support proximal to an opening of the gap;
   forcing a wedge into the gap, between the second object and the wedge support;
   inserting the tool within the tool socket; and
   separating the first portion from the second portion.

* * * * *